Dec. 23, 1969     R. R. BALAGUER     3,485,677

DRY CELL BATTERY

Filed March 31, 1967

United States Patent Office 3,485,677
Patented Dec. 23, 1969

3,485,677
DRY CELL BATTERY
Rodolfo Rodriguez Balaguer, Harbor Beach, Fla., assignor to Patent Holding Corporation, Fort Lauderdale, Fla., a corporation of Florida
Filed Mar. 31, 1967, Ser. No. 627,398
Int. Cl. H01m 17/00
U.S. Cl. 136—100                                       12 Claims

ABSTRACT OF THE DISCLOSURE

A dry cell battery in which the carbon electrode is in the form of a flexible carbon cloth sheet on the surface and in the openings of which is carried the battery mix. An extended metallic anode is in intimate contact with the battery mix over substantially the entire surface area of the carbon cloth sheet. The battery elements may be wound in a tight spiral and inserted in a container approximating in size and shape, a conventional battery of like capacity.

BACKGROUND OF THE INVENTION

The invention relates to dry cell batteries.

The principal object of the invention has been to provide a novel and improved dry cell battery construction affording a high electrode surface area in a relatively small cell volume.

Other objects of the invention have been the provision of a dry cell battery which is efficient at low temperatures, which is resistant to impact damage and which affords a substantially even and economical use of the metal anode material.

Still another object of the invention has been the provision of a dry cell battery which is easy and economical to assemble.

A further object of the invention has been to provide a dry cell battery which is especially adapted and useful for use with a magnesium electro-chemical system as well as the usual zinc system.

SUMMARY

The dry cell battery of the invention comprises an extended surface of carbon cloth woven or formed so as to have openings therein, a quantity of battery mix coated on at least one surface of the carbon cloth and substantially filling the openings in the cloth, a metallic anode member having an extensive surface area corresponding substantially to said one surface of said carbon cloth and positioned in intimate contact with said battery mix and adjacent said carbon cloth surface to form therewith, and with said battery mix, a dry cell battery.

DESCRIPTION OF THE PREFERRED EMBODIMENTS

The dry cell battery of the invention employs, as the carbon electrode, a flexible, electrically conductive carbonized or graphitized fabric which is woven or otherwise formed so as to have openings between the yarns. The carbon fabric used in the invention may be formed by carbonizing or graphitizing a prewoven or formed cellulosic fabric or may be woven or otherwise formed from carbonized or graphitized filaments or yarns. The carbon fabric may be prepared in any suitable way, for example as described in any of United States Patents 3,011,981 issued Dec. 5, 1961 to W. T. Soltes, 3,107,152 issued Oct. 15, 1963 to C. E. Ford et al. and 3,116,975 to C. B. Cross et al.

Figure 3:
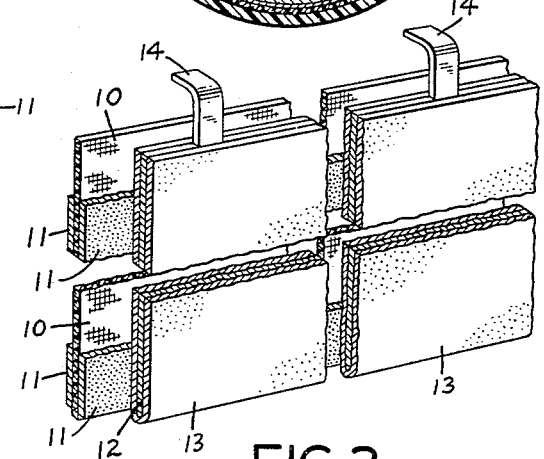
FIG. 3 is an isometric view illustrating certain of the elements of the battery of FIG. 1 in a pre-assembly condition.

In FIG. 3 the carbon fabric electrode is shown at 10. The electrode 10 is coated with battery mix 11. By "battery mix" is meant the depolarizer and electrolyte. The coating may cover one or both surfaces of the fabric. The battery mix should fill the open spaces in the fabric. The depth of the battery mix coating on each side of the carbon fabric electrode 10 may be selected to correspond to the desired battery capacity and so as to result in substantially complete anode metal consumption. Typically the depths of the battery mix coating 11 might be about $\frac{1}{32}''$ on each side of the electrode 10. To facilitate even spreading of the battery mix and to facilitate filling of the void spaces in the carbon fabric with battery mix, the mix is preferably made somewhat more moist than is customary.

The metal anode, shown at 12, is in the form of a sheet corresponding substantially in size and shape to the carbon fabric electrode 10. The anode sheet 12 will preferably be slightly smaller than the carbon fabric electrode 10. For example, the carbon fabric electrode might have dimensions of 12" x 2½", while the metal anode 12 might have dimensions of 11½" x 2", to leave a ¼" margin at each end and at the top and bottom. If desired, a second anode sheet may be provided on the opposite side of electrode 10.

The anode 12 should be provided with a suitable bibulous coating to prevent direct contact between the metal and the battery mix. This bibulous coating is shown at 13 in FIG. 3 and might be a sheet of kraft paper, suitably moistened, covering both sides of the anode. Another form of bibulous coating is the starch gel of U.S. Patent 2,893,899 issued July 7, 1959 to Rodolfo Rodriguez Balaguer. Contact lugs, designated 14, project from one side of anode 12 to provide for external electrical contact. Those portions of the lugs 14 which may come into contact with the battery mix or vapors are preferably provided with the bibulous coating.

Figure 1:
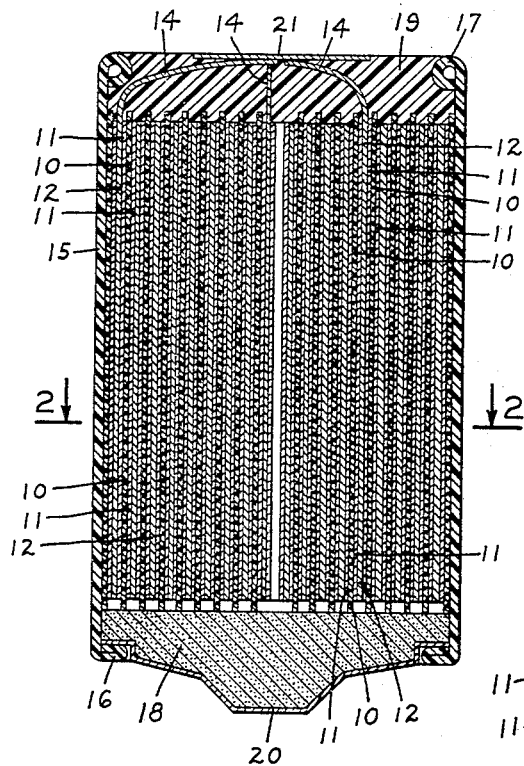
FIG. 1 is a longitudinal sectional view of a dry cell battery embodying the invention.
Figure 2:
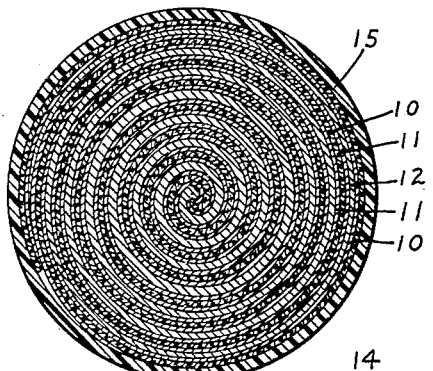
FIG. 2 is a cross-sectional view taken along the line 2—2 of FIG. 1.

The anode 12 should be sufficiently flexible to conform to the ultimate shape of the battery, e.g., the spiral wound configuration shown in FIGS. 1 and 2. Typically, the anode 12 might be made from a sheet of magnesium metal about 0.001 to 0.005" thick. The thickness of the anode metal is desirably selected so that the metal will be substantially completely consumed when the battery is fully discharged. For a magnesium cell, providing about 10 grams of magnesium to about 40–50 grams of battery mix will usually be found to be an efficient ratio for small cells comparable in capacity to the D size battery.

The battery mix 11 may be of any type suited to the anode metal selected. A typical battery mix composition for use with a magnesium anode is the following, percentages being by weight:

88% type M manganese dioxide (synthetic) chemical ore.
1% $Mg(OH)_2$.
3% $Ba(CrO_4)$.
8% acetylene black wet 600 ml./1000 g. with 250 g./l. $Mg.Br_2 + 0.25$ g./l. $Na_2CrO_4$.

The battery elements should be suitably enclosed to avoid loss of moisture and to prevent the escape of corrosive chemicals. The battery elements should also be held together tightly to promote the necessary chemical reactions and to minimize internal reistance.

One desirable arrangement is illustrated in FIGS. 1 and 2 in which the battery elements of FIG. 3 are wound in a tight spiral and are enclosed in a polyester resin-impregnated fiberglass jacket 15. The jacket 15 is in the form of a tube having an inwardly extending annular flange 16 at one end thereof and an inwardly extending annular flange 17 at the other end thereof. The flange 16 is preferably flat and is of double thickness. The flange 17 is preferably rounded in cross-section.

One end of tube 15 is closed by an electrically conductive carbon plug 18 while the other end of tube 15 is closed by an electrically insulating plastic plug 19. The plug 19 should be resistant to the chemicals in and produced by the battery mix. The plug 19 may be molded in situ as described in my copending United States patent application Ser. No. 598,515, filed Dec. 1, 1966.

The carbon electrode cloth 10 with the battery mix 11 and the anode 12 with its bibulous covering 13, assembled as in FIG. 3, are wound into a tight spiral and are inserted in the tube 15. In FIGS. 1 and 2 the bibulous covering 13 provided on anode 12 is not shown separately. As mentioned previously both ends of the carbon electrode cloth extend beyond the respective ends of the anode. At one end this projecting carbon cloth contacts the carbon plug 18 while at the other end the projecting carbon cloth abuts against plastic plug 19.

The spiral wound battery assembly should be pressed tightly into contact with carbon plug 18 to afford good electrical contact between the carbon cloth 10 and the carbon plug 18. The outer end of plug 18 is provided with a metal cap 20 which serves as the battery positive terminal.

The contact lugs 14, of which at least there or four are preferably provided, extend through plastic plug 19 and are in electrical contact with a metal disc 21 carried in an annular recess on the outer surface of plug 19. The disc 21 thus serves as the battery negative terminal.

With a magnesium battery, loss of moisture represents a serious problem. Hence it is desirable that the plugs 18 and 19 form moisture tight seals with the tube 15 at the respective ends of the battery. While the polyester resin impregnated fiberglass tube 15 is moisture tight, it is not impervious to the passage of gases. Hence gases generated during cell discharge, notably hydrogen, will diffuse through the fiberglass tube 15.

The magnesium metal forming the anode 12 is converted by chemical reaction during cell discharge to an oxide whose volume is about 150% of the metal volume. This enlargement of the anode volume results in a very large expansive force which will tend to crack the battery wall. However, the resin-impregnated fiberglass tube 15 is very strong and will resist the expansive stress. Moreover, the carbon cloth material is compressible and compression of this material assists in relieving the expansive forces.

In the case of zinc cells it is desirable to leave space in the cell for the accumulation of liquid produced during cell discharge. In the battery construction of FIGS. 1 and 2 such space is left by virtue of the greater width of the carbon cloth than the anode metal. This differential may be made as large as necessary to accommodate the liquid.

Figure 4:
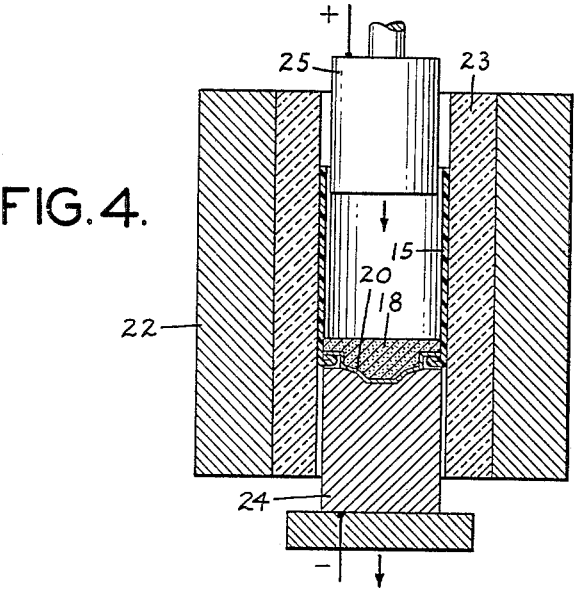
FIG. 4 is a longitudinal sectional view of an apparatus for use in forming the battery of FIG. 1.

The carbon plug 18, which might be made from a mixture of 80% graphite and 20% coal tar pitch, may be molded in situ, as shown in FIG. 4. In FIG. 4, a mold is formed by a steel cylinder 22 which has a ceramic electrically insulating liner 23. One end of the mold cavity is closed by a die 24 which is shaped to accommodate end cap 20 and flange 16. With die 24 in place, end cap 20 and tube 15 are inserted in the mold cavity. Tube 15 will have been resin-impregnated and the resin will have set, except for the end portion of tube 15 intended later to form flange 17. The resin impregnation and setting may be accomplished in the usual way familiar in fiberglass reinforced plastic constructions. The charge of graphite and pitch powder is inserted in the mold cavity and is contacted by a metal plunger 25. A hydraulic pressure is applied to plunger 25 and die 24 and an electrical current is passed therethrough. The combined current and pressure convert the charge to a green carbon which is electrically conductive and which is in moisture tight sealing contact with the tube 15.

The partially assembled battery may then be removed from the mold and the spiral wound battery elements may be inserted. The flange 17 may then be formed and set and the plastic plug 19 can then be formed.

It is desirable that the end plug 19 be formed from a resin which will bond to the resin impregnating the flange 17. Preferably the same polyester resins will be used for this purpose and the setting of the resins may be simultaneous.

The completed battery, as shown in FIGS. 1 and 2, may correspond substantially in size and shape to a conventional battery of like capacity. Thus a battery constructed in accordance with the invention in the usual D size would have a capacity comparable to a D size cell made in the usual way but of like constituents.

While the invention has been described in connection with specific embodiments thereof, various modifications thereof will occur to those skilled in the art without departing from the spirit and scope of the invention as set forth in the appended claims.

What is claimed is:

1. A dry cell battery, comprising a sheet of flexible electrically conductive cloth consisting essentially of carbonized carbon and having a multiplicity of openings therein and forming the carbon electrode of said battery, a quantity of battery mix coated on at least one surface of said carbon cloth sheet and filling said openings therein, a metallic sheet forming the anode of said battery and being placed in juxtaposition with said cloth, a bibulous material carried on the surface of said anode to prevent direct contact between the metal of said anode and the battery mix, and means to maintain said carbon cloth sheet, said battery mix and said metallic sheet in intimate contact whereby electrochemical reactions will occur when said anode and said carbon electrode are joined in an external circuit.

2. A dry cell battery, comprising a sheet of flexible electrically conductive cloth consisting essentially of carbonized carbon and having a multiplicity of openings therein and forming the carbon electrode of said battery, a quantity of battery mix coated on at least one surface of said carbon cloth sheet and filling said openings therein, a flexible metallic sheet forming the anode of said battery and having a size and shape corresponding substantially to the size and shape of said sheet of carbon cloth, said metallic sheet being placed in juxtaposition with said sheet of carbon cloth, a bibulous material carried on the surface of said anode to prevent direct contact between the metal of said anode and said battery mix, means including a moisture tight enclosure to contain said carbon cloth sheet, said battery mix and said metallic sheet and to maintain the same in intimate contact whereby electrochemical reactions will occur when said anode and said carbon electrode are joined to an external circuit, positive and negative terminal means located externally of said enclosure, means electrically interconnecting said positive terminal means and said carbon electrode, and means electrically interconnecting said negative terminal means and said anode.

3. A dry cell battery as set forth in claim 2 in which said metallic sheet is made of magnesium and in which said battery mix contains a magnesium system electrolyte.

4. A dry cell battery as set forth in claim 2 in which said carbon cloth sheet is a loosely woven graphite cloth.

5. A dry cell battery as set forth in claim 2 in which said carbon cloth sheet is a loosely woven graphite cloth formed by graphitizing a woven cellulosic fabric.

6. A dry cell battery as set forth in claim 2 in which said enclosure comprises a resin-impregnated fiberglass envelope.

7. A dry cell battery as set forth in claim 2 in which said carbon cloth sheet is coated on both sides with said battery mix and in which said carbon cloth sheet and said metallic sheet are wound together in a tight spiral.

8. A dry cell battery as set forth in claim 7 in which said enclosure comprises a cylindrical tube made of electrically insulating material surrounding said spiral.

9. A dry cell battery as set forth in claim 8 in which said tube is formed from resin-impregnated fiberglass fabric.

10. A dry cell battery as set forth in claim 8 in which an electrically conductive carbon plug closes one end of said tube, said carbon plug being in direct electrical contact with said carbon cloth.

11. A dry cell battery as set forth in claim 10 in which an electrically insulating, corrosion resistant plastic plug closes the other end of said tube, said negative terminal means being mounted externally of said plastic plug and said means electrically interconnecting said negative terminal means and said anode passing through said plastic plug.

12. A dry cell battery as set forth in claim 2 in which said means electrically interconnecting said negative terminal means and said anode comprises a plurality of lugs projecting from said anode at spaced points along an edge thereof and being integral therewith.

References Cited

UNITED STATES PATENTS

| | | | |
|---|---|---|---|
| 536,996 | 4/1895 | Barnett | 136—121 |
| 2,807,658 | 9/1957 | Hatfield | 136—121 |
| 3,048,645 | 8/1962 | Ruben. | |
| 3,117,034 | 1/1964 | Tirrell. | |
| 3,177,099 | 4/1965 | Kirk et al. | |
| 3,192,071 | 6/1965 | Vinal | 136—121 |
| 3,272,655 | 9/1966 | Balaguer | 136—100 |
| 3,282,738 | 11/1966 | Langer et al. | 136—121 |
| 3,350,235 | 10/1967 | Balaguer | 136—100 |
| 3,364,073 | 1/1968 | Balaguer | 136—100 |
| 3,370,298 | 2/1968 | Balaguer | 136—100 |
| 2,954,417 | 9/1960 | Lehovec et al. | 136—13 |
| 2,621,220 | 12/1952 | Kirk et al. | 136—138 |
| 3,071,637 | 1/1963 | Horn et al. | 136—122 |

WINSTON A. DOUGLAS, Primary Examiner

C. F. LEFEVOUR, Assistant Examiner

U.S. Cl. X.R.

136—121